US006947097B1

(12) United States Patent
Joanblanq

(10) Patent No.: US 6,947,097 B1
(45) Date of Patent: Sep. 20, 2005

(54) PROCESS FOR DETECTING BLACK BARS IN A VIDEO IMAGE

(75) Inventor: Anne-Françoise Joanblanq, Thorigne Fouillard (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/565,346

(22) Filed: May 5, 2000

(30) Foreign Application Priority Data

May 6, 1999 (FR) .................................. 99 05777

(51) Int. Cl.[7] ................................................ H04N 5/46

(52) U.S. Cl. ...................... 348/558; 348/556; 348/672; 382/254

(58) Field of Search ................................ 348/700–702, 348/180, 556, 558, 913, 473, 435.1, 672, 348/552; 382/254, 260, 264; H04N 5/46

(56) References Cited

U.S. PATENT DOCUMENTS

| | | | | |
|---|---|---|---|---|
| 5,249,049 A | | 9/1993 | Kranawetter et al. | |
| 5,309,234 A | * | 5/1994 | Kranawetter et al. | 348/473 |
| 5,345,270 A | * | 9/1994 | Saeger et al. | 348/435.1 |
| 5,351,135 A | | 9/1994 | Saeger | |
| 5,384,599 A | * | 1/1995 | Casavant et al. | 348/470 |
| 5,486,871 A | | 1/1996 | Filliman et al. | |
| 5,686,970 A | * | 11/1997 | Tani et al. | 348/556 |
| 5,748,257 A | * | 5/1998 | Kawabata et al. | 348/28 |
| 5,760,840 A | * | 6/1998 | Tani et al. | 348/558 |
| 5,808,697 A | * | 9/1998 | Fujimura et al. | 348/672 |
| 5,949,494 A | * | 9/1999 | Yamagata et al. | 348/556 |
| 5,956,092 A | * | 9/1999 | Ebihara et al. | 348/445 |
| 5,990,971 A | * | 11/1999 | Nakai et al. | 348/558 |
| 6,148,103 A | * | 11/2000 | Nenonen | 382/169 |
| 6,208,385 B1 | * | 3/2001 | Konishi et al. | 348/558 |
| 6,340,992 B1 | * | 1/2002 | Markandey | 348/445 |
| 6,366,706 B1 | * | 4/2002 | Weitbruch | 382/254 |
| 6,373,533 B1 | * | 4/2002 | Kawabata et al. | 348/672 |
| 6,504,954 B1 | * | 1/2003 | Goldstein | 382/168 |
| 6,507,372 B1 | * | 1/2003 | Kim | 348/630 |

FOREIGN PATENT DOCUMENTS

| | | | |
|---|---|---|---|
| EP | 0716542 | 6/1996 | |
| EP | 0800311 | 10/1997 | |
| EP | 0837602 | 4/1998 | |
| EP | 0913994 | 5/1999 | |
| WO | 94/19911 | 9/1994 | |
| WO | 96/13936 | 5/1996 | H04N 7/085 |

* cited by examiner

*Primary Examiner*—Brian P. Yenke
(74) *Attorney, Agent, or Firm*—Joseph S. Tripoli; Harvey D. Fried; Christine Johnson

(57) ABSTRACT

A process for detecting black bands in a video image within a luminance range corresponding to low luminance values comprises the steps of: calculating, for each line situated in a location in which a black band can be expected to be found if present in said video image, a value relating to a maximum number of occurrences of points having the same luminance value; averaging said value over said lines in said location; calculating a threshold dependent on said average; and, comparing said value relating to said maximum number of occurrences obtained for a new line with said threshold. Applications relate, for example, to the detection of the "letterbox" format.

14 Claims, 3 Drawing Sheets

PROCESS FOR DETECTING BLACK BARS IN A VIDEO IMAGE

FIELD OF THE INVENTION

The invention relates to a process for automatically detecting horizontal black bands, for example for implementing automatic zoom for video images in the 4/3 format on 16/9 screens.

BACKGROUND OF THE INVENTION

Processes exist for automatically detecting so-called "letterbox" formats comprising black horizontal bars at the top and bottom of the television image. These processes are generally based on a measurement of the video levels over the first few and last few lines of the video image. It is as a function of the luminance levels averaged over these first few lines and over these last few lines that the "letterbox" format is detected.

These processes are however not very reliable since they depend on luminance settings, on the signal/noise ratio, on the insertion of logos into the black bands, etc.

The purpose of the invention is to alleviate the aforesaid drawbacks.

SUMMARY OF THE INVENTION

Its subject is a process for detecting black bands in a video image, characterized in that, in a luminance range corresponding to low luminance values:

- it calculates, per line, a value relating to a maximum number of occurrences, that is to say a maximum number of points having the same luminance value, for lines situated in the usual location of a black band,
- it averages this value over these lines,
- it calculates a threshold dependent on this average,
- it compares the value relating to a maximum number of occurrences obtained for a new line, with this threshold.

According to a particular embodiment, the value relating to a maximum number of occurrences, for a line, is the maximum number of occurrences (Maxzone_Principal i) of the points of the complete line or of a line portion.

According to another embodiment, the value relating to a maximum number of occurrences, for a line, is the sum of the first, second and third greatest occurrences (Maxzone i) of the points of the complete line or of a line portion.

According to other embodiments, the threshold is also dependent on the signal-to-noise ratio of the image. It can be a percentage of the average, this percentage possibly being dependent on the value of the average, over these lines, calculated for occurrences corresponding to the points of a complete line (Z1).

According to a particular embodiment, the value relating to the maximum number of occurrences, for a line, is calculated for all the points of the line (Z1).

According to another embodiment, the image is split up into vertical zones (Z2, Z3, Z4), and the value relating to the number of occurrences, for a line, is calculated for only those points of the line portion corresponding to this zone. The comparison can be performed for various zones.

According to a particular embodiment, the threshold relates to Maxzone_Principal i for a high signal-to-noise ratio and Maxzone i for a low signal-to-noise ratio.

The comparison can be performed over several images and the detection can depend on a reliability criterion dependent on the number of identical detections for the various images. The reliability criterion can also be dependent on the number of identical detections for the various zones.

The main advantage of the invention is reliable detection of the black bands and hence of the "letterbox" formats even if the information-carrying video, that is to say the video lines outside of the black bands, is much the same as the levels of the black. The displaying of a logo in a black band does not impede such detection owing to the fact that the detection can be performed for vertical zones so as to detect or eliminate the effects of the small insets present in the black bands.

BRIEF DESCRIPTION OF THE DRAWINGS

The characteristics and advantages of the invention will become better apparent from the following description given by way of example and with reference to the appended figures in which.

DETAILED DESCRIPTION OF PREFERRED EMBODIMENTS

FIG. 1*a* represents a video image in the 4/3 format comprising an upper black band and a lower black band and displayed on a 16/9 screen. The right- and left-hand sides of the screen are filled in with vertical black bars. In an exemplary use of the process, an automatic zoom is triggered by the detection of the horizontal bars so as to display a full-screen image.

Figure 1:
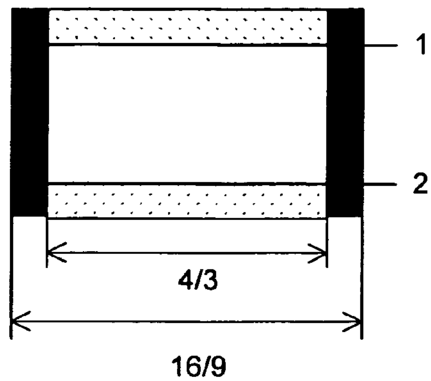
FIG. 1 represents an image in the letterbox format.

The detection of the black bands amounts in fact to determining in the image the first and the last line of information-carrying video which will subsequently be referred to as the "active" video. The first line of the "active" video, in FIG. 1, is referenced 1 and the last line is referenced 2.

The principle of the algorithm implemented within the invention relies on the comparing of a value corresponding to the maximum number of pixels having the same luminance value in the low levels, over a video line, with a threshold dependent on the quality of the image to be processed.

A criterion defining the quality of the image is therefore evaluated as a function of the noise level within the image and also depending on the apportionment per line of the video points over a luminance histogram for the low levels, for example those below 63. The "purer" the black, the larger the value of the maximum of the histogram will be.

Figure 2A:
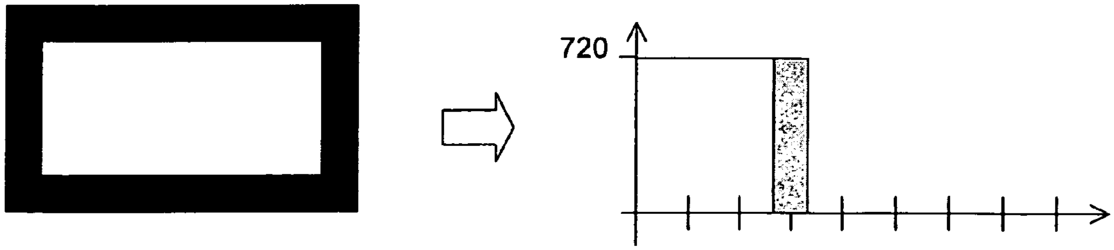
FIG. 2*a* represents a histogram corresponding to a homogeneous black level.

FIG. 2*a* represents a histogram corresponding to horizontal black bands having a homogeneous black level.

The labelling used for the histogram corresponds, for the ordinate axis, to the number of occurrences, that is to say to the number of samples and for the abscissa axis, to the luminance values. In the case considered, the 720 samples corresponding to a video line have the same luminance value.

The histograms are described hereinbelow, with the same labelling.

Figure 2B:
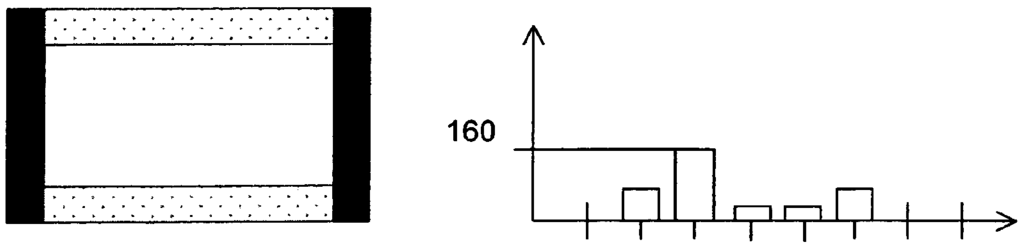
FIG. 2*b* represents a histogram corresponding to different levels of black.

FIG. 2*b* represents a histogram corresponding to different levels of black.

The most frequent luminance level, in the example illustrated, appears for 160 samples out of the 720 samples of a line. This is the first maximum peak over a line of samples.

For reliability of detection reasons, and so as to take account of insets or logos displayed or of any type of display in zones defined in the black bands, the characterization of the image is carried out over several zones, in our example over four zones.

Figure 3B:
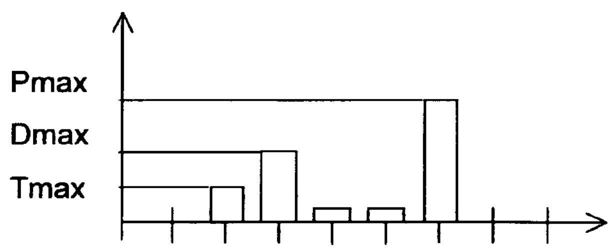
FIG. 3*b* represents a histogram corresponding to zone 1.
Figure 3A:
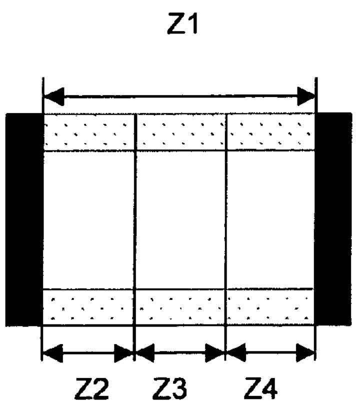
FIG. 3*a* represents an apportioning of the image into zones for the calculation of the histograms.

FIG. 3*a* represents such zones:

- a first zone Z1 corresponding to the width of a line of the image in the 4/3 format, i.e. 720 points,
- a second, third and fourth zone Z2, Z3, Z4 corresponding to the first third, to the second third and to the third third of a video line, i.e. 240 points for each zone.

FIG. 3*b* represents a histogram corresponding to zone 1. The values Pmax, Dmax and Tmax are respectively the first, second and third maxima relating to the number of samples per luminance value. They therefore correspond to the three values of low luminance, below 63 in our example, which are most commonly encountered in a line.

The characteristic values chosen for zone 1 are, for each line, the maximum number of identical luminance values Pmax and the sum of the values Pmax, Dmax and Tmax.

Figure 3C:
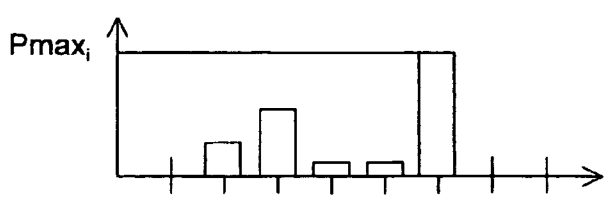
FIG. 3*c* represents a histogram corresponding to zones 2 to 4.

FIG. 3*c* represents a histogram corresponding to zone 2, 3 or 4. For these zones, the characteristic value chosen is the value $Pmax_i$. This is therefore the maximum occurrence for the line portion corresponding to zone i.

The various characteristic values are extracted per video line and therefore yield histograms corresponding to 720 samples for zone 1 and 240 samples for each of the other zones.

The quality criteria chosen correspond to the average values of these measured characteristic values, for an image or a frame, over a part of the image situated in the usual location of a black band of the image.

This is for example an average over the first n video lines displayed. In a particular example, n=16. By way of comparison, a black band corresponds to several tens of video lines.

In what follows, the generic term image will be used to designate both an image and an frame.

One therefore has the following five quality criteria:

- Noise level calculated in a known manner for an image or a set of images or else precalculated, for example if the image transmission conditions do not influence its value.
- Average value, over the set of n lines of each of the zones i, of the value $Pmax_i$, this giving four values called $Maxzone\_Principal_i$ for the four zones i.
- Average value, over the set of n lines of each of the zones i, of the sum Pmax+Dmax+Tmax, this giving four values called $Maxzone_i$ for the four zones i.

These quality criteria, which therefore relate to the purity of the black, are evaluated for an image.

Thresholds are then defined for each of these criteria for detecting the black bands. It is the values of the quality criteria which are obtained for the first n lines of the image which are utilized for calculating the thresholds and for detecting the "active" video in the subsequent lines.

The threshold values calculated depend on the signal-to-noise ratio.

For a noise-free image (signal-to-noise ratio S/B≧30 dB), a first test is performed on the value $Maxzone_1$.

Figure 4A:
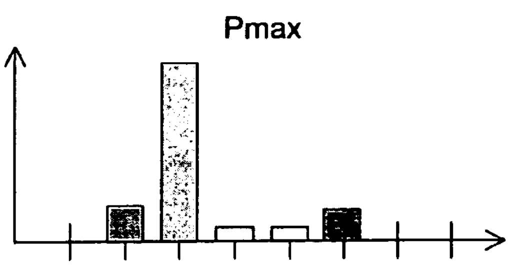
FIG. 4*a* represents a histogram for which the threshold value taken into account is the maximum number of occurrences.

If this value is greater than 480 evidencing good purity of the black, the threshold chosen for zone i ($Val\_Pure_i$) is the value $Maxzone\_Principal_i$, lowered by a margin of the order of 12%. FIG. 4*a* shows such an example.

Figure 4B:
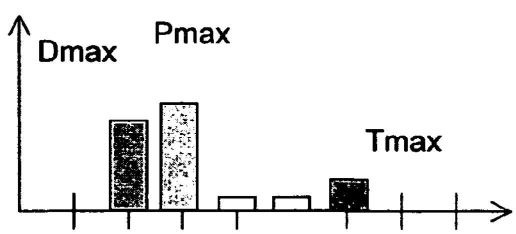
FIG. 4*b* represents a histogram for which the threshold value taken into account relates to the sum of the first, second and third greatest occurrences.

If this value is less than or equal to 480, the threshold value chosen for zone i ($Val\_Threshold_i$) is the value $Maxzone_i$, lowered by a margin of 25% if $Maxzone\_Principal_1$ is less than or equal to 240 or else lowered by a margin of 18% if $Maxzone\_Principal_1$ is greater than 240 and therefore corresponds to a greater purity of black. FIG. 4*b* shows an example where the threshold is calculated with respect to $Maxzone_i$.

The better the quality of the image, the smaller the margins.

Minimum threshold values are imposed, 270 for zone 1 and 270/3 for the other zones, when the calculated threshold values are lower than these floor values.

The above exemplary algorithm is repeated hereinbelow, supplemented for the other values of signal-to-noise ratio (slightly noisy image and very noisy image). It will be observed that, in the case of a very noisy image, the floor threshold values are higher so as to maintain good reliability in the detections.

1) Signal/Noise≧30 dB if ($Maxzone_1$>480), then the threshold value is:

$$Val\_Pure_i = Maxzone\_Principal_i - Maxzone\_Principal_i/8 (-12\%)$$

or else if ($Maxzone_1 \leqq 480$):

and if ($Maxzone\_Principal_1 \leqq 240$), then:

$$Val\_Threshold_i = Maxzone_i - Maxzone_i/4 (-25\%)$$

unless ($Val\_threshold_1<270$), then $Val\_Threshold_1=270$ unless ($Val\_threshold_{2\text{-}3\text{-}4}<90$), then $Val\_Threshold_{2\text{-}3\text{-}4}=90$ or else, if ($Maxzone\_Principal_1>240$), then:

$$Val\_Threshold_i = Maxzone_i - Maxzone_i/8 - Maxzone_i/16 (-18\%)$$

unless ($Val\_threshold_1<270$), then $Val\_Threshold_1=270$ unless ($Val\_threshold_{2\text{-}3\text{-}4}<90$), then $Val\_Threshold_{2\text{-}3\text{-}4}=90$ 2) 25 dB≦Signal/Noise<30 dB if ($Maxzone_1$>480), then:

$$Val\_Threshold_i = Maxzone_i - Maxzone_i/16 (-6\%)$$

or else, if ($Maxzone_1 \leqq 480$), then:

$$Val\_Threshold_i = Maxzone_i - Maxzone_i/8 - Maxzone_i/16 (-18\%)$$

unless ($Val\_threshold_1<270$), then $Val\_Threshold_1=270$ unless ($Val\_threshold_{2\text{-}3\text{-}4}<90$), then $Val\_Threshold_{2\text{-}3\text{-}4}=90$ 3) Signal/Noise<25 dB $$Val\_Threshold_i = Maxzone_i - Maxzone_i/16(-6\%)$$

unless ($Val\_threshold_1$>480), then $Val\_Threshold_1$=480 unless ($Val\_threshold_{2\text{-}3\text{-}4}$>160), then $Val\_Threshold_{2\text{-}3\text{-}4}$=160

Thus, according to the value of the average, over the first n lines, of the sum of the first three maxima of the histogram, $Maxzone_i$, and of the value of the noise, the detection is carried out, for each subsequent line j, either by comparing the sum of the first three maxima per line for this line j $(Pmax_i+Dmax_i+Tmax_i)_{linej}$ with the associated threshold ($Val\_threshold_i$), or by comparing the value of the first maximum for this line j $(Pmax_i)_{linej}$ with the associated threshold ($Val\_pure_i$).

For an image rated as "pure", the useful information is contained in the value of $Pmax_i$. The detection with regard to this single value is more accurate.

These comparisons are made for each of the zones and hence by taking the values of the maxima for each part of line j corresponding to a zone.

The altering of the threshold value as a function of the purity of the black makes it possible to be more accurate in the detection. If the image is found to be only slightly noisy, homogeneous, during the measurements over the first few lines, the calculated threshold can be closer to the corresponding calculated average value (that is to say have a small margin). These threshold adjustments, when the quality of the image is declared to be good, allow the detection of insets, logos, etc even if they affect only a very small zone of the image.

The following criteria can be used to confirm or define a line to be "active" video.

- The part of the image in which the line or lines detected as "active video" are situated, for example the first third and the last third of the image. For an image of 288 lines, the detection confirmation zone may be situated for example between line 16 and line 288/3 for the upper part of the image and line 288×2/3 and 288-16 for the lower part.
- The number of identical detections over each of the four zones of the same frame.
- The number of samples and the position of the first maximum. (The confidence level is dependent on the magnitude of the peak and on the value of the black).

A time criterion can be added. The 4 values detected, corresponding to the 4 zones, plus the value chosen, are stored in memory for each frame, over p frames. A zonewise majority procedure is then performed so as to determine, per zone, the "top" line corresponding to the first line of the image and the "bottom" line corresponding to the last line of the information-carrying image.

The presence of a logo in a zone can thus be detected with great reliability.

A higher weighting is given to the spatial or temporal criterion depending on the type of detection desired, that is to say depending on whether one wishes to ignore the logo or not, preserve the black bands or not in the presence of a logo, etc.

What is claimed is:

1. A process for detecting black bands in a video image within a luminance range corresponding to low luminance values, comprising the steps of:

calculating, for each line situated in a location in which a black band can be expected to be found if present in said video image, a value relating to a maximum number of occurrences of points having the same luminance value;

averaging said value over said lines in said location;

calculating a threshold dependent on said average;

comparing said value relating to said maximum number of occurrences obtained for a new line with said threshold.

2. The process according to claim 1, wherein the value relating to said maximum number of occurrences for a line is the maximum number of occurrences of the points of a complete line or of a line portion.

3. The process according to claim 2, wherein the value relating to a maximum number of occurrences for each said line is a sum of the first, second and third greatest occurrences of the points of said complete line or of said line portion.

4. A process according to claim 3, wherein the threshold relates to sum of said first, second and third greatest occurrences for a low signal-to-noise ratio.

5. A process according to claim 2, wherein said threshold relates to said maximum number for a high signal-to-noise ratio.

6. A process according to claim 1, wherein the threshold is also dependent on a signal-to-noise ratio of said video image.

7. A process according to claim 1, wherein said threshold is a percentage of said average.

8. A process according to claim 7, wherein said percentage is dependent on the value of said average, over said lines in said location, calculated for occurrences corresponding to the points of a complete line.

9. A process according to claim 1, wherein said value relating to said maximum number of occurrences for each said line is calculated for all the points of said line.

10. A process according to claim 1, comprising the further step of splitting said video image into vertical zones, and calculating said value relating to said number of occurrences for each said line only for those points of line portions corresponding to said zones.

11. A process according to claim 10, comprising the further step of performing said comparison for various ones of said zones.

12. A process according to claim 11, wherein said detection is dependent on a reliability criterion dependent on the number of identical detections for said various ones of said zones.

13. A process according to claim 1, comprising the further step of performing said comparison over several of said video images.

14. A process according to claim 13, wherein said detection is dependent on a reliability criterion dependent on said number of identical detections for said various ones of said video images.

* * * * *